UNITED STATES PATENT OFFICE.

FREDRICK ABERLE, OF BRIDGEPORT, CONNECTICUT.

MECHANICAL TOY.

SPECIFICATION forming part of Letters Patent No. 264,426, dated September 19, 1882.

Application filed June 26, 1882. (No model.)

*To all whom it may concern:*

Be it known that I, FREDRICK ABERLE, of the city of Bridgeport, in the county of Fairfield and State of Connecticut, have invented a new and Improved Mechanical Toy; and I do hereby declare the following to be a full, clear, and exact description of the construction and operation of the same, with reference to the accompanying drawings.

The object of my invention is to imitate the walking or running movement of donkeys, mules, zebras, horses, and quadrupeds of similar species. This I accomplish by attaching a coiled spring, train of gears, and other mechanism to the body of the toy in such a manner as to produce an alternate rising-and-falling and vibratory motion to the legs, and consequent forward movement of the whole figure, when the feet are in contact with the ground, a floor, table, or other flat horizontal surface, after winding up said spring with a key, all of which will herein be fully explained and described.

In the accompanying drawings, Figure 1 is a side view, and Fig. 2 is a top view, of my improved mechanical toy. Fig. 3 is a detached view of one of the fore legs.

Similar letters of reference indicate corresponding parts.

The body is constructed of two thin plates of metal, A A', having the general form and outline of the animal the toy is designed to represent, and separated at a proper distance from each other by means of the bolts 1 2 3 4 5.

B is the main driving-shaft, fitted to turn freely in holes in said plates, one end of which is extended considerably beyond one of the plates on the outside, and made square, so as to be turned by a socket-key when desired, the square extended portion being shown at *b*.

C is the mainspring, the outer end of which is secured to the bolt 2, the inner end being secured to the main shaft.

D is a ratchet-wheel secured to the main shaft.

E is a pawl, pivoted at one end to one of the sides of the driving-wheel F, the opposite or pointed end fitting into the teeth of the ratchet-wheel.

G G' are shafts fitted to turn freely in holes in the body-plates.

H H' are pinions secured to said shafts and gearing with the main driving-wheel.

I I' are spur-wheels, also secured to said shafts.

J J' are shafts, also fitted to turn freely in holes in the body-plates.

K K' are pinions secured to said shafts and gearing with spur-wheels I I'.

L is a worm-wheel secured to shaft J'.

M is a shaft fitted to turn freely at each end in holes in extensions N N', and having secured to it the speed-regulator fan O and worm P, the latter gearing with worm-wheel L.

Upon the extreme ends of shafts J J' are secured the eccentrics Q Q' Q'' Q''' in such a manner as to revolve upon the outside of the body-plates.

R R' R'' R''' are the legs of the animal, having the round holes S to receive said eccentrics, being secured to the body-plates by means of the headed screw-studs T T' T'' T''', which pass through the oblong holes U U', the studs also serving as a fulcrum for said legs to rise and fall and vibrate upon when actuated by the eccentrics.

The driving mechanism is so adjusted and timed and the eccentrics so secured to their respective shafts in relation to each other as to cause all the four feet of the animal to touch a level surface at same time when all said eccentrics are in the horizontal position shown in the drawings, so that as said eccentrics revolve with the shafts in the direction indicated by the arrows the feet of one fore leg and the opposite hind leg will be raised from the surface and swung forward, while the other two feet remain in contact with said surface during the backward vibratory motion of their legs, thus causing the body of the animal to move forward as these motions are alternately produced by the driving mechanism.

The body and legs of the toy are covered with wood, cloth, tin, iron, or other material having a form closely resembling the animal the same is designed to represent, but which it has not been deemed necessary to show in the drawings.

I am aware that mechanical toys have been constructed to imitate the walking movement of quadrupeds by operating the hind legs with cams or eccentrics driven by clock-work mechanism, which give a rising-and-falling and vibratory motion to the same, and transferring the vibratory motion only to the fore legs by

C. A. ADAMS.
CORSET BUSK AND CLASP.
No. 264,427. Patented Sept. 19, 1882.
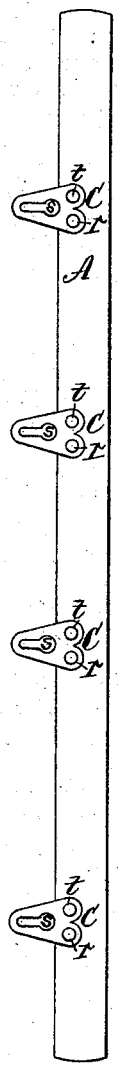
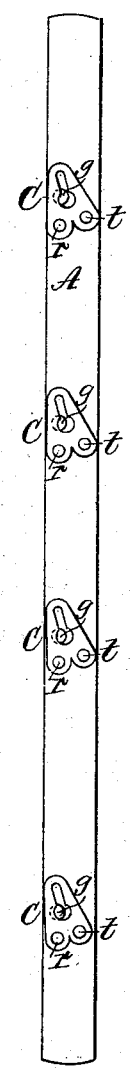
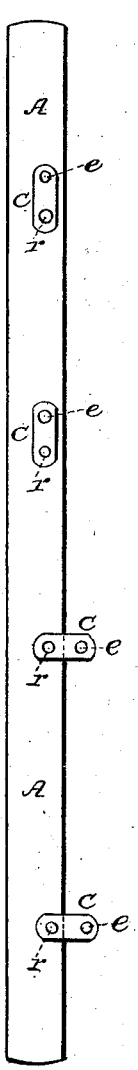
WITNESSES:
W. L. Bennem
G. W. Barrett
INVENTOR:
Catharine Anne Adams
BY E. S. Renwick
ATTORNEY.